United States Patent [19]

Pine

[11] Patent Number: 5,488,496
[45] Date of Patent: Jan. 30, 1996

[54] PARTITIONABLE DISPLAY SYSTEM

[76] Inventor: Jerrold S. Pine, 9555 Saddlebrook Dr., Boca Raton, Fla. 33496

[21] Appl. No.: 206,660

[22] Filed: Mar. 7, 1994

[51] Int. Cl.$^6$ .................................................. G02F 1/1335
[52] U.S. Cl. ................................................. 359/63; 359/83
[58] Field of Search ................................. 359/63, 62, 83

[56] References Cited

U.S. PATENT DOCUMENTS

| | | | |
|---|---|---|---|
| 3,281,960 | 11/1966 | Gross | 35/9 |
| 4,111,533 | 9/1978 | Nakamura et al. | 359/63 |
| 4,559,556 | 12/1985 | Wilkins | 358/88 |
| 4,636,866 | 1/1987 | Hattori | 358/236 |
| 4,859,994 | 8/1989 | Zola et al. | 340/705 |
| 4,870,486 | 9/1989 | Nakagawa et al. | 385/92 |
| 4,978,202 | 12/1990 | Yang | 350/331 |
| 5,002,368 | 3/1991 | Anglin | 350/334 |
| 5,007,715 | 4/1991 | Verhulst | 350/334 |
| 5,113,285 | 5/1992 | Franklin et al. | 359/465 |

FOREIGN PATENT DOCUMENTS

| | | | |
|---|---|---|---|
| 63-179326 | 7/1988 | Japan | 359/63 |
| 2116826 | 5/1990 | Japan | 359/63 |
| 4138423 | 5/1992 | Japan | 359/63 |
| 5173127 | 7/1993 | Japan | 359/63 |
| 6160834 | 6/1994 | Japan | 359/63 |

*Primary Examiner*—William L. Sikes
*Assistant Examiner*—James A. Dudek
*Attorney, Agent, or Firm*—Oltman and Flynn

[57] ABSTRACT

An apparatus to display images with partitionable regions allowing visible, invisible, and narrow field of view of displayed information includes a polarizing means to form a plane polarized light background from incident light, a liquid crystal panel capable of forming cross-polarized images against a plane polarized background, and a proximal movable polarizing means to distinguish images on liquid crystal panel from its plane polarized background. Linear translation of the movable polarizer partitions the liquid crystal panel into regions that are visible where there is optical alignment of the liquid crystal panel, background polarizer, and movable cross-polarizer. An optional remote polarizer complements the movable polarizer and provides a narrow viewing angle of images not visible on the liquid crystal panel. By creating a user defined visible, invisible, and narrow field of view of displayed information on an LCD assembly, electronic devices incorporating such a display can be made to provide computing privacy, accessibility to the device, strategic information separation, and information separation to multiple users.

23 Claims, 16 Drawing Sheets

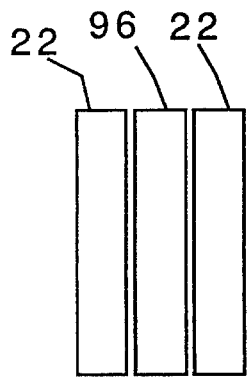
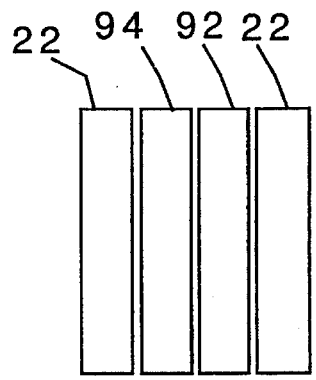
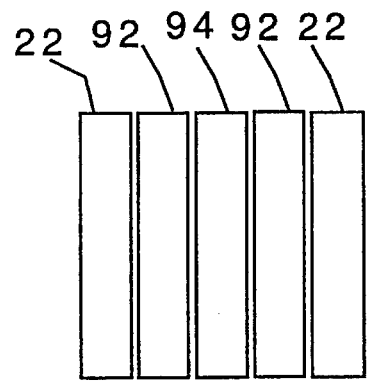
Fig. 8A
Prior Art
Fig. 8B
Prior Art
Fig. 8C
Prior Art
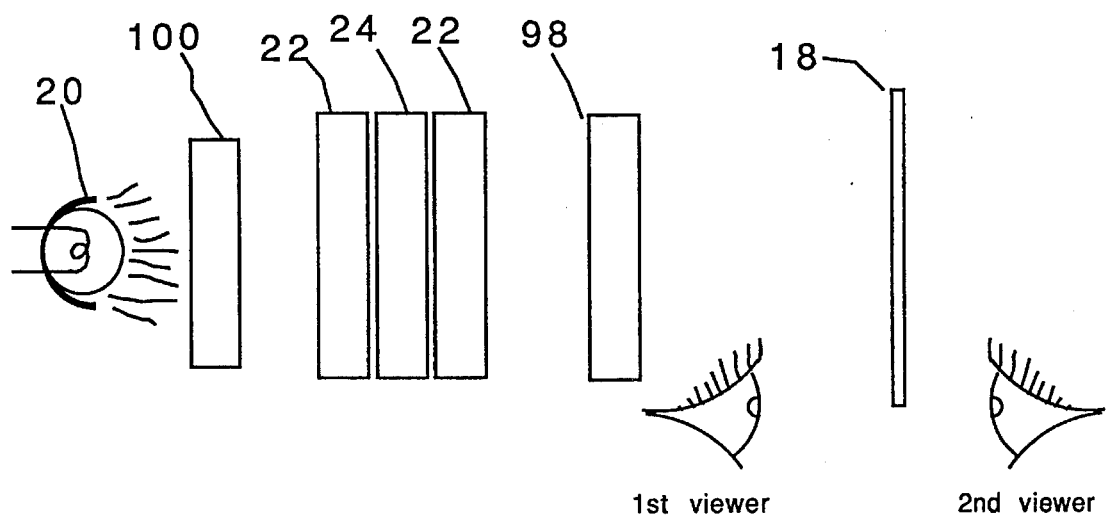
Fig. 9
Prior Art

PARTITIONABLE DISPLAY SYSTEM

BACKGROUND OF THE INVENTION

This invention relates to a Liquid Crystal Displays (LCD) assembly in portable computing devices and electronic specialty products where the user can define the visible regions of an LCD display. More specifically, this invention relates to an LCD display where multiple polarizers define visible regions of a portable computer display to preserve computing privacy or provide a means on electronic novelties to amuse or educate a user via selective display of an answer or acknowledgement. The LCD configurable polarized region may also serve to gain access to or to facilitate usage of the electronic device.

Liquid crystal displays are a common display means on a large variety of portable computing devices and electronic novelty products. They are the display means of choice because of their power efficiency and high contrast characteristics. The images displayed on liquid crystal devices can be alphanumeric, graphic, pictorial, or video in nature. Liquid crystal displays are actually light valves that utilize cross polarization to effectively transmit or block light. To accomplish the graphic, alphanumeric, pictorial, or video display of information, a majority of common LCD systems are configured with two fixed polarizers sandwiching two glass plates with embedded electrodes that confine a mesomorphic material. Certain mesomorphic material (liquid crystals) have two useful properties. Light passing through the crystalline material rotates its plane of polarization, and mesomorphic crystals will freely align themselves to an electric field. When the crystals are illuminated by a polarized light source and aligned by an electric field, the change in light polarization over the aligned crystalline region is uniform, and can be cross-polarized to impede transmission of light. When the electric field is removed, the crystalline alignment is random and light polarization becomes effectively scattered, allowing transmission of light. There are three functional classifications of LCDs: reflective(watches without a backlight), transmissive (LCD projection) and transflective (laptop computers) which allow use of ambient light or backlighting. All three require one polarizer to polarize incident light, the liquid crystal to scatter or rotate the polarized light, and another polarizer to cross-polarize (block) all light rotated by the aligned liquid crystal. The cross polarizer can be located proximal to the display or remotely by the user. U.S. Pat. No. 4,859,994 issued to Zola et al. discloses a closed caption movie subtitle system where the LCD assembly comprises one fixed polarizer and the liquid crystal assembly. Audience members that required closed captioning would wear glasses correctly polarized and see a changing display beneath the movie screen. The rest of the audience would not be distracted by the constant messaging. In this embodiment the LCD always requires a set of glasses for remote cross-polarization to read the screen and viewing is absolute, where the user sees the entire display or nothing.

In portable computing devices such as laptop computers, the user frequently is in a public place such as an airport or on an airplane. The majority of these computing devices are carried for business purposes, and the nature of the work is proprietary. The screens normally display 20–30 lines of text while working on a word processing document. As the last line on the screen is typed, the entire text scrolls upward one line at a time. For added confidentiality, the users may display only the text line that they are currently writing and hide the rest of the document. For ultimate security, the users may wish to make the entire screen blank and use remote cross-polarized glasses so only they can see the text on the screen. Another portable computing application uses the new personal digital assistant technology such as the Apple Newton, made by Apple Computer Inc., Cupertino, Calif. A salesman may partition a portion of the screen where the customer sees retail prices and warranty information, and the salesman using cross-polarized glasses can see cost, inventory levels, and sales tips on the rest of the screen. He may repartition the screen for full viewing by the customers so they can answer a survey or any other function.

Some electronic novelties such as databanks are commonly used as dictionaries, language translators, and telephone address books. Many contain multi-line displays learning tools. When using these as reference tools, the user would configure the screen for complete viewing. However in a flash card mode, only the first line of the screen would be visible until the users would want to confirm their guess. The first line would contain a phrase to translate, a word to be defined, or a math problem. After guessing, they could make the consecutive lines visible by changing the cross-polarized region and determine the validity of their answer. The same configuration can be used for electronic novelties that ask trivia questions, or provide amusement by encrypting or disguising some puzzle or game.

LCD projection technology such as video projectors could have user defined cross-polarized regions to allow complete viewing, partial viewing, or selective viewing. On airplanes, inflight entertainment is provided using projection video. The system is employed for FAA safety instructions to all passengers at the beginning of the flight. Later for paid entertainment, headsets for audio are purchased to enjoy the feature film. The stewardess could set the cross-polarized region to display the entire screen for safety instructions. Later the screen can be set so the entire cabin views the top 10% of the screen, where the flight crew can display relevant text messages to the entire planeload of passengers. The lower 90% of the screen would contain the feature film, where passengers interested in entertainment can purchase cross-polarized glasses to view it. The remainder of the passengers wouldn't be disturbed by the video only portion of the film.

It can be seen that by creating a user-defined, cross-polarized region of an LCD display, electronic devices incorporating such a display can be made to provide computing privacy, accessibility to the device, strategic information separation, and information separation to multiple users.

SUMMARY OF THE INVENTION

It is therefore an object of this invention to provide a liquid crystal display system where at least one of the polarizers associated with creating a cross-polarized image on the liquid crystal display is displaceable. The alignment of said polarizer determines the visible and invisible regions of the display and a retaining means assures alignment until a new partitioning of the display region is desired.

It is yet another object of this invention to provide computing privacy by incorporating said liquid crystal display system into a portable computing device such as a laptop computer and providing an additional remote polarizer to provide a narrow viewing angle of the display. The combination of selective partioning of the liquid crystal display and narrow viewing angle via remote polarizer allows a user to acquire text and graphic visual feedback from their computing session without others in their vicinity receiving the same.

It is yet another object of the invention to provide or deny user access to an electronic device or display means by selective partioning of the liquid crystal display and enabling usage of said device by providing discreet polarizng means. It is yet another object of this invention to provide strategic separation of information displayed on electronic devices using liquid crystal displays by selectively aligning at least one displaceable polarizer with known data containing regions of a liquid crystal display.

It is yet another object of this invention to provide strategic separation of information displayed on electronic devices using liquid crystal displays by providing at least one polarizer proximal to the liquid crystal display to segment information between users with and without remote polarizers.

BRIEF DESCRIPTION OF THE DRAWINGS

The present invention will become more fully understood from the detailed description given hereinbelow and the accompanying drawings which are given by way of illustration only, and thus are not limitive of the present invention, and wherein:

FIGS. 8A, 8B, and 8C are prior art schematic views of different LCD configurations.

FIG. 9 is prior art schematic of a typical LCD Projection system.

DETAILED DESCRIPTION OF THE PREFERRED EMBODIMENTS

Figure 1:
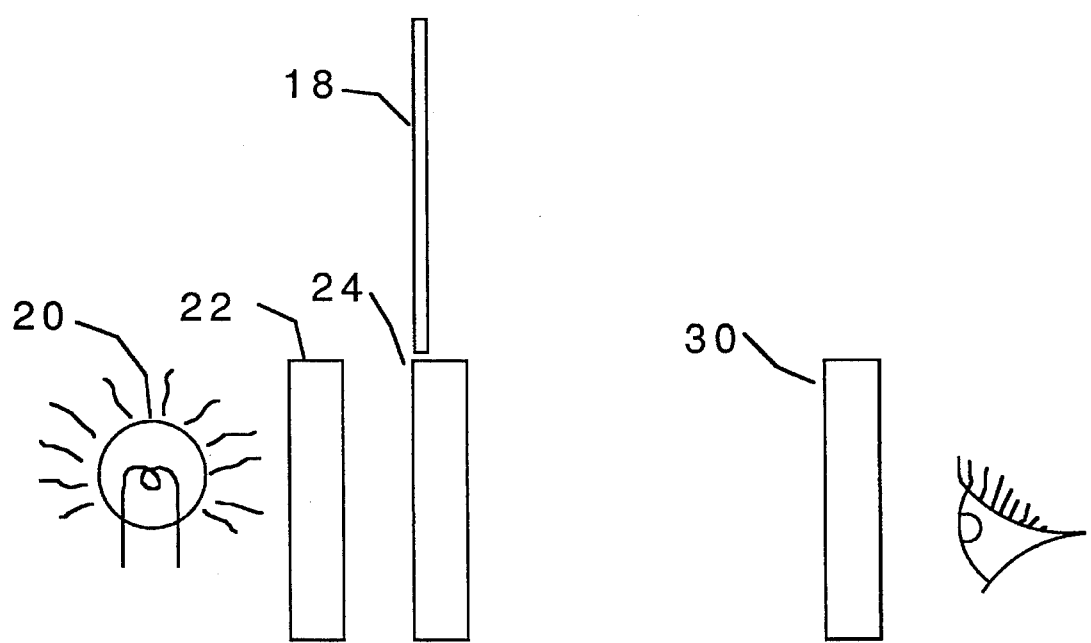
FIG. 1 is prior art of a movie subtitle viewing sytem.

Referring to FIG. 1, Prior art, there is shown a movie subtitle system where a liquid crystal display 24 is located below a movie screen 18. A polarizer 22 is placed between a light 20 and liquid crystal display 24 such that light passing through the liquid crystal is polarized. The liquid crystal display 24 after being driven by a proper driving circuit, produces alphanumeric text cross-polarized to the polarized light background. A second polarizer 30 worn by an audience member in the form of glasses enables the audience member to view the text. Those members in the audience not wearing the polarizer 30 will not be able to view the subtitles, and will only see polarized light emanating from the display 24 as a faint haze. It can be infered from the prior art that the system depicted in FIG. 1 cannot provide the ability to selectively partition the liquid crystal display 24 into visible and non-visible regions. Further, viewing of the liquid crystal display system without remote polarizer 30 is not possible.

Figure 2A:
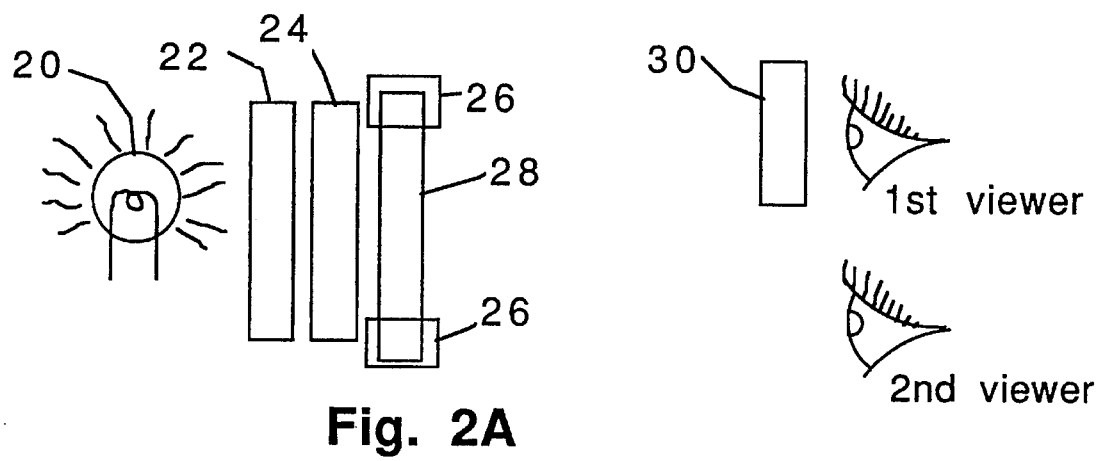
FIGS. 2A, 2B, and 2C are partial cross-sectional views of an LCD assembly, while it is in use, according to the invention.
Figure 2B:
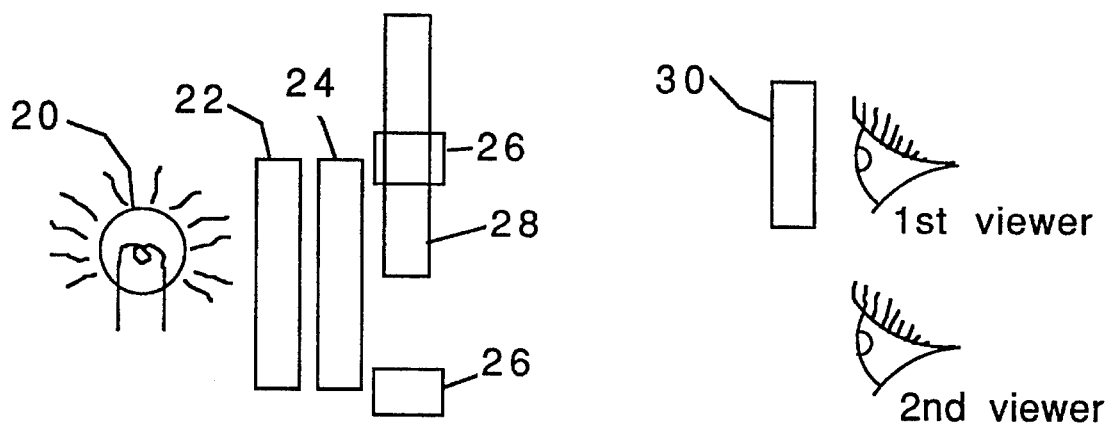
Figure 2C:
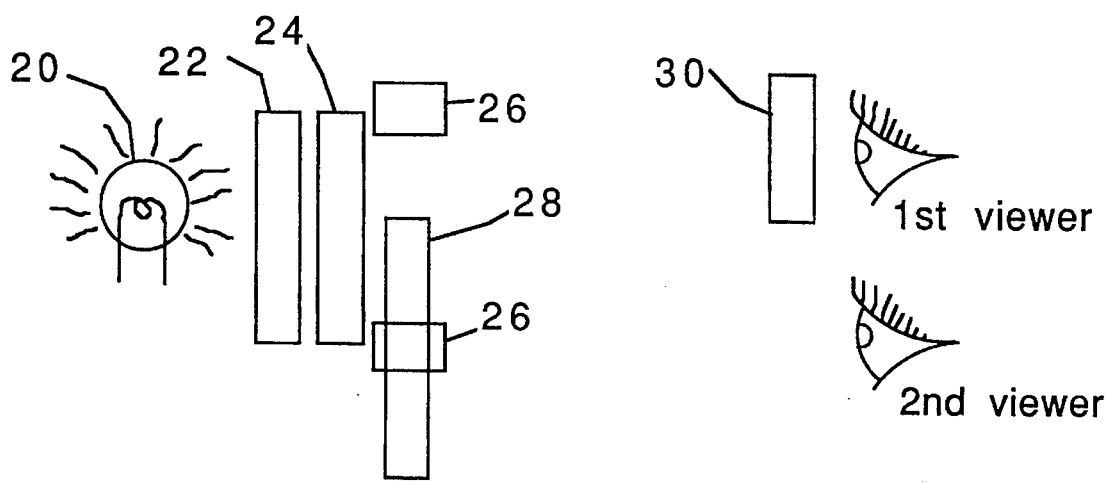
Figure 3:
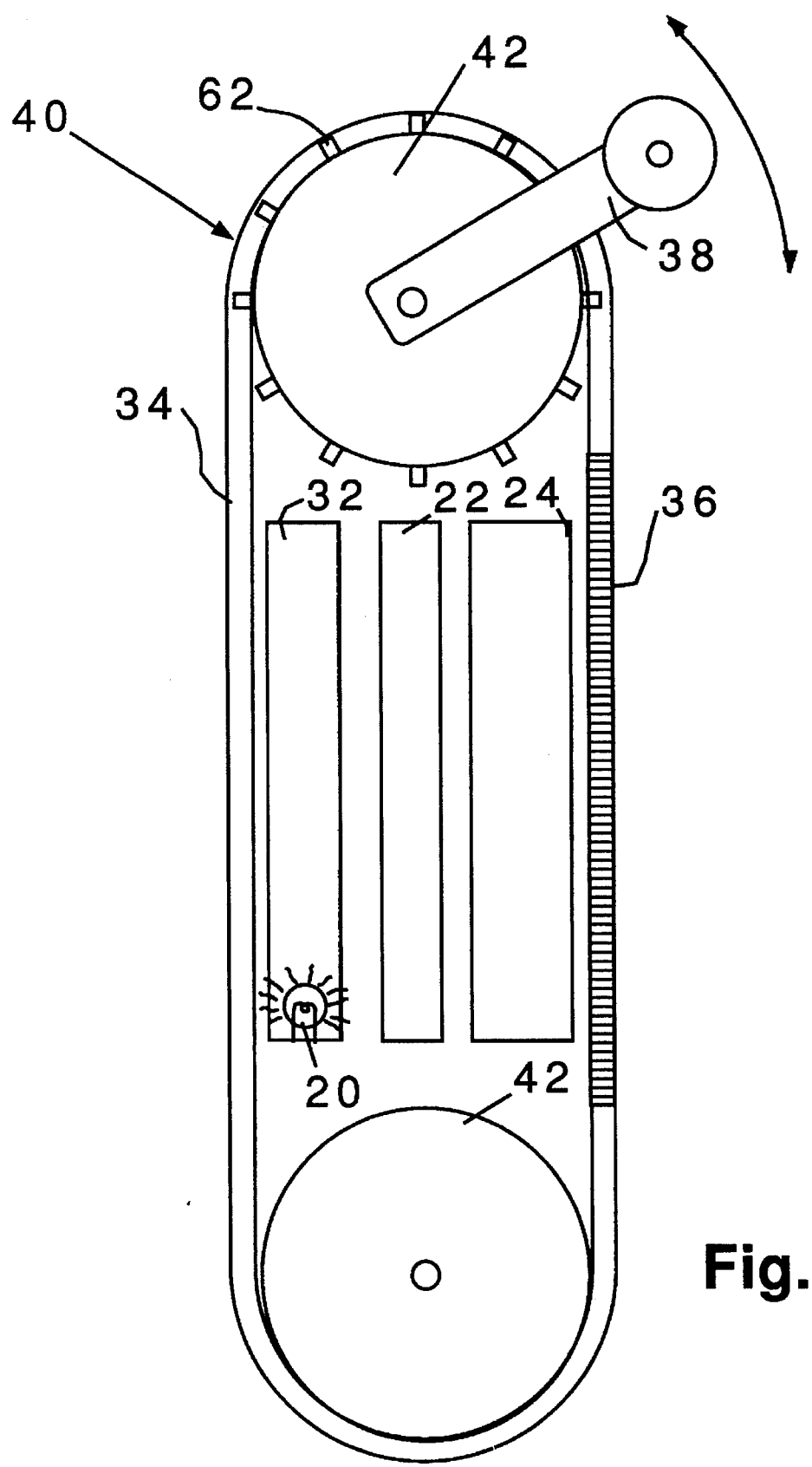
FIG. 3 is a partial cross-sectional view of an LCD assembly according to one embodiment of the invention.

FIGS. 2A, 2B, and 2C refer to the first embodiment of the present invention. Using a liquid crystal display 24 capable of displaying images comprising alphanumerics, graphics, pictorials, or video, optically aligned with a rear polarizer 22 and light source 20, cross-polarized images on a plane polarized background are formed. With the addition of a movable polarizer 28 that is held proximal to liquid crystal display 24 by retaining means 26, the images prompted to liquid crystal display 24 are completely visible to both the first viewer using remote polarizer 30 and the second viewer with no remote polarizing means. Referring to FIG. 2B, movable polarizer 28 has been displaced in an upward manner so that it is aligned with the top part of the liquid crystal display 24. Visibility of images displayed on liquid crystal display 24 are now limited to the upper region of the display for the second viewer and is still completely visible to the first viewer utilizing remote polarizer 30. Referring to FIG. 2C the movable polarizer 28 has been displaced in a downward manner so that it is aligned with the bottom part of the liquid crystal display 24. Visibility of images displayed on liquid crystal display 24 are now limited to the lower region of the display for the second viewer and is still completely visible to the first viewer utilizing remote polarizer 30. In FIGS. 2A, 2B, and 2C it can be appreciated that the retaining means 26 can have many enabling means to provide relative alignment of movable polarizer 28 and liquid crystal 24, and should not be limited to the sliding means illustrated. Further, the linear displacement of movable polarizer 28 is shown in a vertical manner. It should be appreciated that the movable polarizer displacement can occur vertically, horizontally, diagonally, or in any random manner. Although the system is illustrated with three polarizers, any number of polarizers can be used proximally to create any pattern of visible and non-visible regions for the viewers. The plane of polarization of polarizer 22, polarizer 28, and polarizer 30 impacts the performance of the system herein described. Given identical planes of polarization of rear polarizer 22, movable polarizer 28, and remote polarizer 30 with cross-polarized text on liquid crystal display 24, provides dark text on a light background with visiblity as described above. Given the plane of polarization of rear polarizer 22 with cross-polarized text on liquid crystal display 24 and cross-polarized planes of polarization on movable polarizer 28 and polarizer 30, provides light text on a dark background with visiblity as described above. However, if polarizer 28 is cross-polarized to polarizer 30, then the visibility of first and second viewers in FIG. 2B would be reversed. The first viewer with remote polarizer 30 would see the upper portion of liquid crystal display 24 blacked out and the lower portion visible, and the second viewer with no remote polarizer would have the upper portion visible and would see a light haze with no distinguishable images on the lower portion of the liquid crystal display 24. It should be known that either rear polarizer 22 or movable polarizer 28 can be displaced with respect to liquid crystal 24 to afford visible region partitioning of the liquid crystal display 24. Both polarizers may be displacable in different directions affording variable partitioning in multiple directions. These embodiments apply to gray scale and color liquid crystal displays. In FIG. 3 another embodiment of the present invention where a liquid crystal display system 40 is shown. In addition to liquid crystal display 24 and rear polarizer 22, a light wedge 32 has been added to distribute light from light source 20. Two cylindrical rollers 42 have been placed above and below liquid crystal 24, rear polarizer 22, and light wedge 32. A handle 38 has been attached to the top roller 42 to provide a means to induce rotational translation of top roller 42. A clear transparent, continuous belt 34 made from a material such as acetate film is tensioned between the two rollers 42. On a region, that is the height and width of the liquid crystal display 24, of the belt 34 a polarizer 36 is constructed. The plane of polarization of polarized region 36 is such that it is polarized or cross-polarized to polarizer 22 to enable the viewing mode desired, light background or dark background. Via rotational translation of top roller 42, the polarized region 36 can be positioned in perfect alignment with liquid crystal display 24 allowing complete viewing of images displayed. With further rotational translation of roller 42, a portion of liquid crystal display 24 is not aligned with polarized region 36, and is no longer visible. Optionally, a remote polarizer 30 not illustrated may be used to see regions of liquid crystal display 24 not properly cross-polarized. The handle 38 may be attached directly to roller 42 or be attached via some means of transmission to reduce or accelerate rotational translation. Rollers 42 may be sprocketed 62 and corresponding features on belt 34 will be required. The transparent portion of belt 34, if not continuous, may be formed by an elastomer or rigid open belted structure. The handle 38 may be replaced by any manual, rotationally-inducing means such as a thumbwheel or knob.

Figure 4:
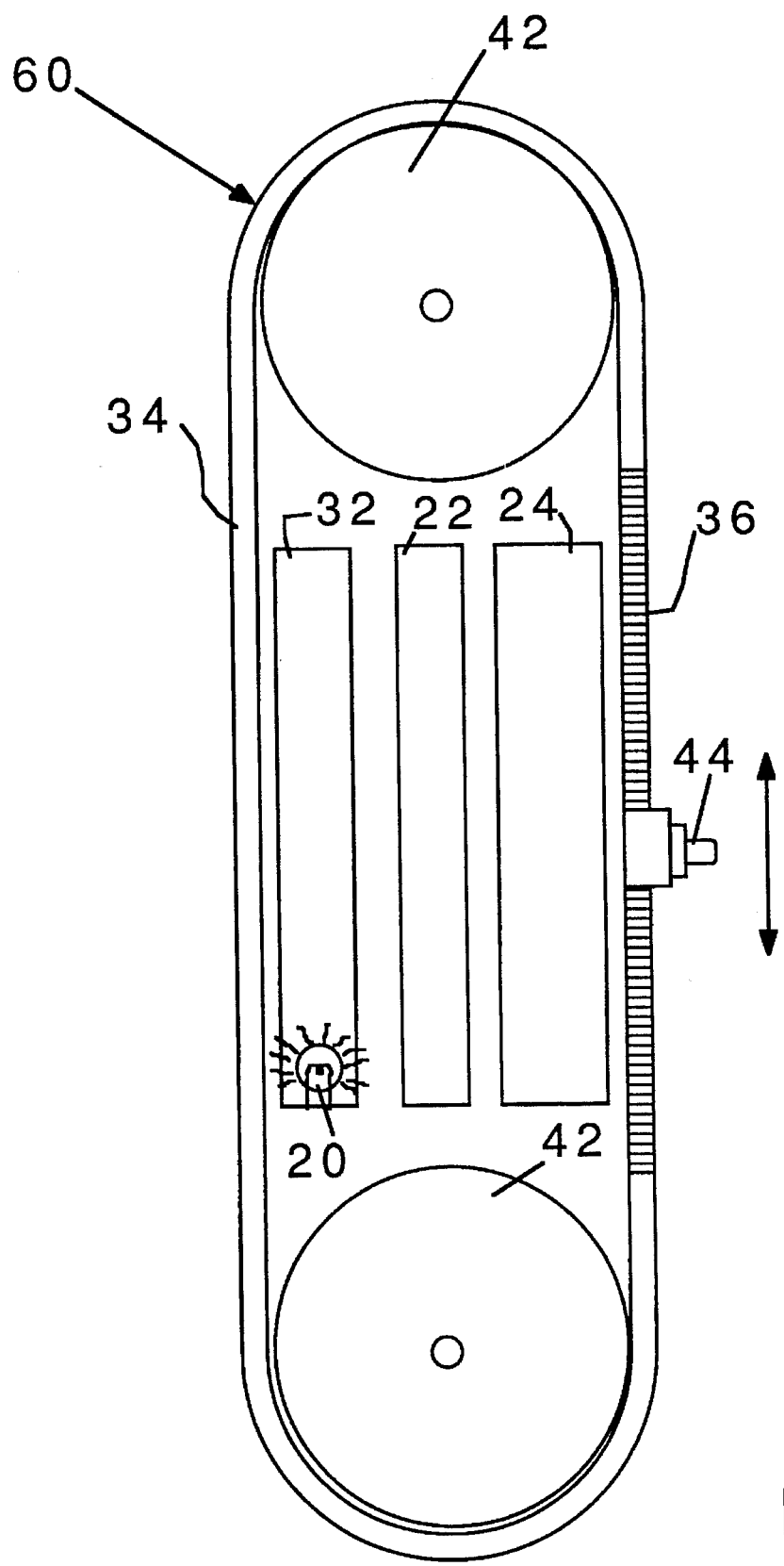
FIG. 4 is a partial cross-sectional view of an LCD assembly according to another embodiment of the invention.

In FIG. 4 another embodiment of the present invention where a liquid crystal display system 60 is shown. In liquid crystal display system 60, the rotationally inducing handle means for translation of the polarized region 36 in system 40 has been replaced by a linearly translating lever 44 which is attached to belt 34. The user can align polarized region 36 to partition the visible region of liquid crystal display 24 by dragging the lever 44 to the desired alignment.

Figure 5:
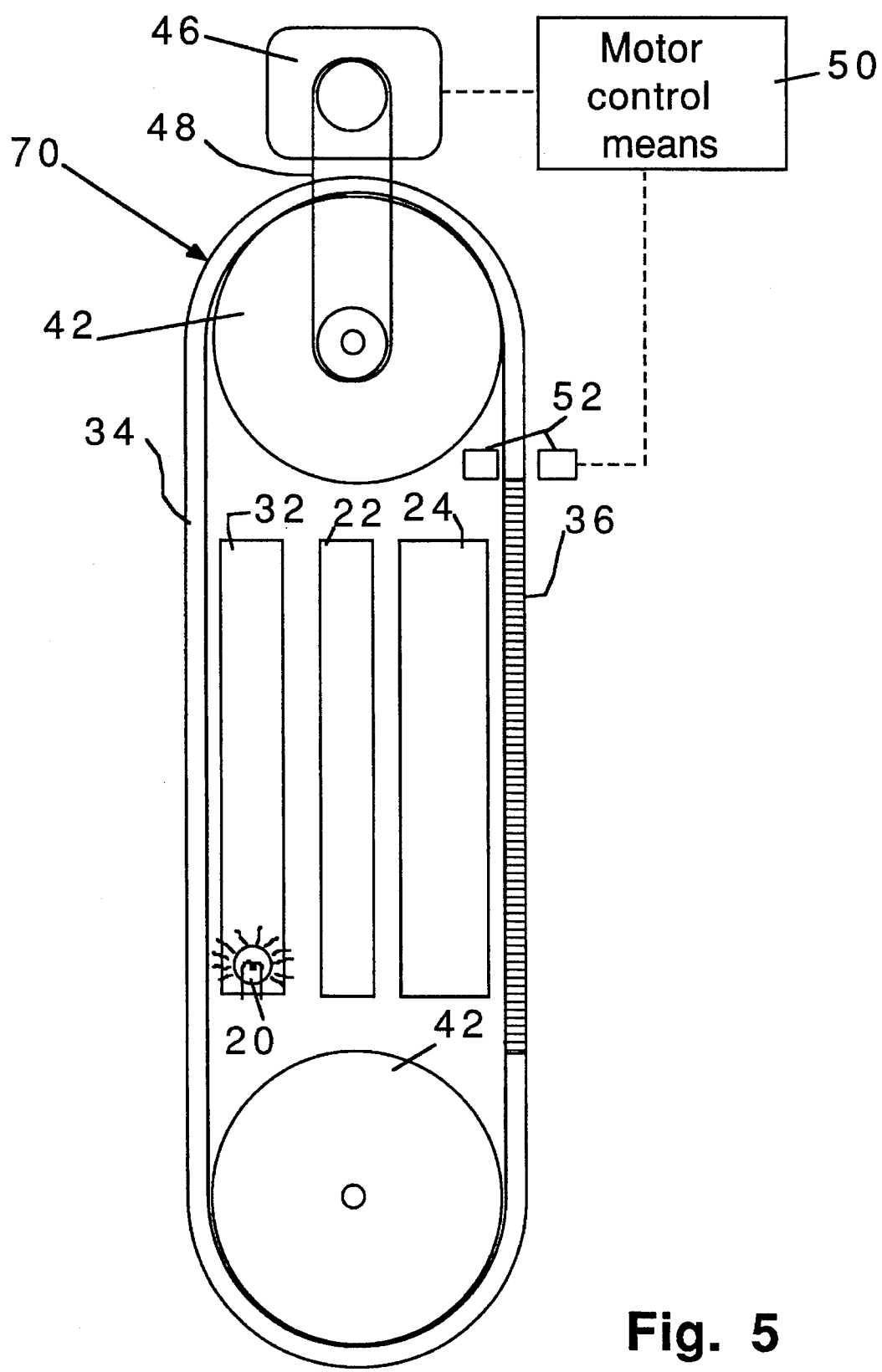
FIG. 5 is a partial cross-sectional view of an LCD assembly according to another embodiment of the invention.

FIG. 5 shows another embodiment of the present invention wherein liquid crystal display system 70 is shown. The manual means for displacing the polarized region 36 of belt 34 has been replaced by an automated or semi-automated means. The motor 46 coupled with transmission means 48 rotates roller 42 to displace belt 34. The motor has a control means 50 which may be initiated by a switch or software contained within the electronic device the liquid crystal display system 70 is used in. The motor control means may have an optional sensing means 52 to determine the positioning of the polarized region 36 as it translates past the liquid crystal display 24. The motor control means start/stop switch, may use positional feedback from sensing means 52 to close-loop control the motor displacement or may simply drive the motor 46 to a hard stop or a predetermined distance. The motor controls elements mentioned here are well known in the art and will not be discussed in detail. The transmission means 48 may be a belt as illustrated or gearing or any other transmission means known in the art.

Figure 6A:
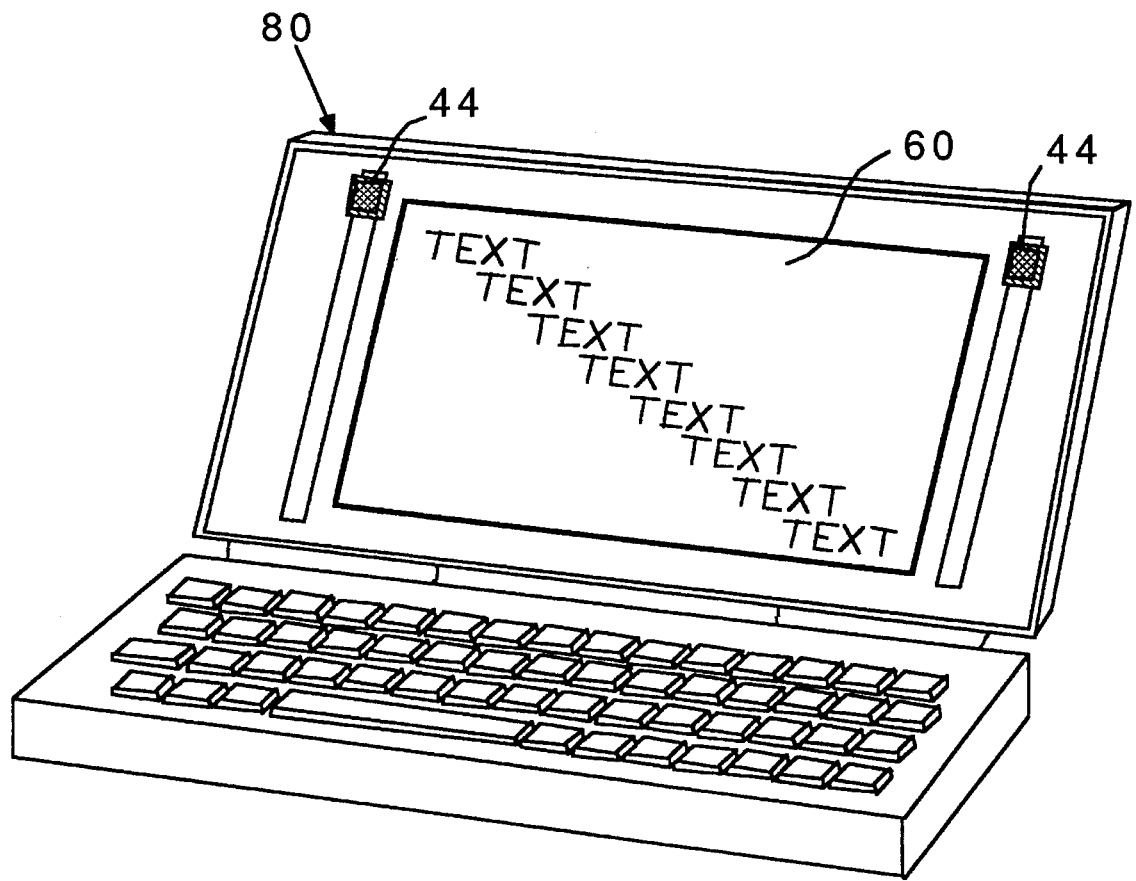
FIGS. 6A, 6B, and 6C are perspective views of a laptop computer utilizing an LCD assembly, while it is in use, according to the invention.
Figure 6B:
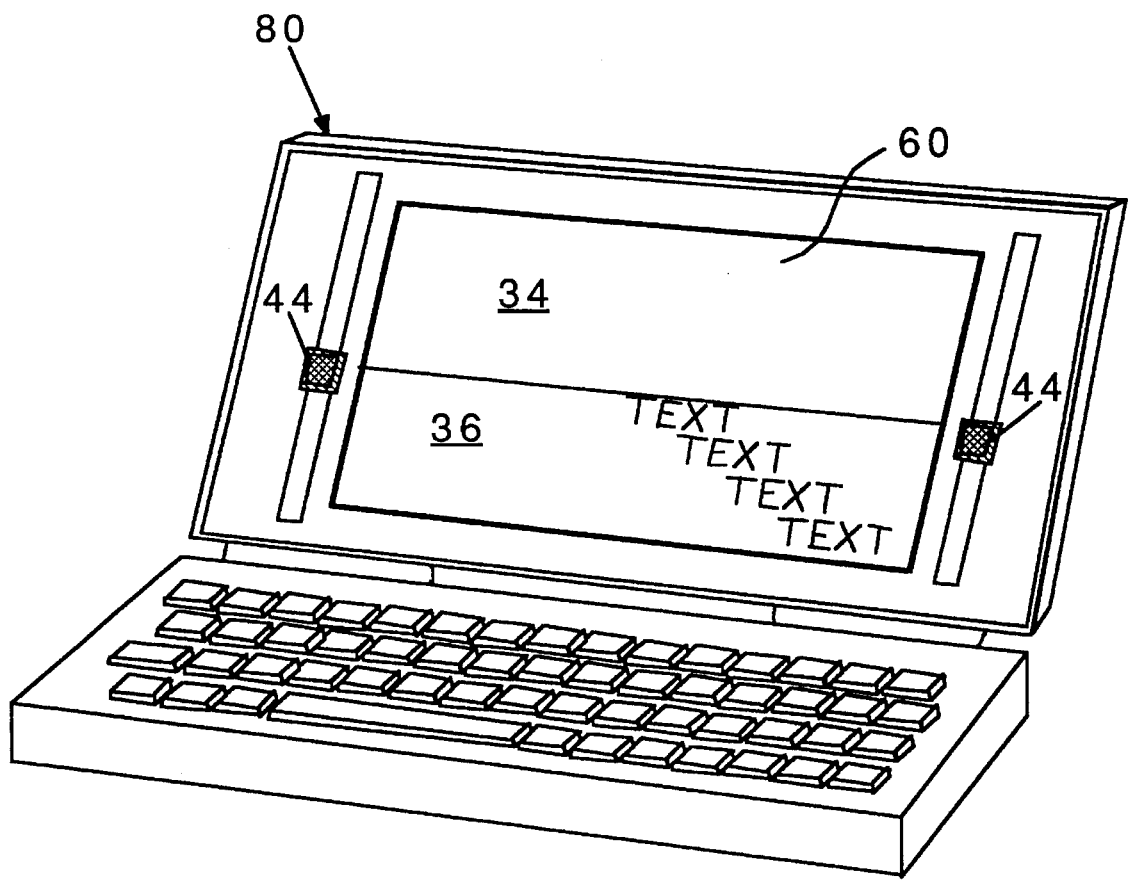
Figure 6C:
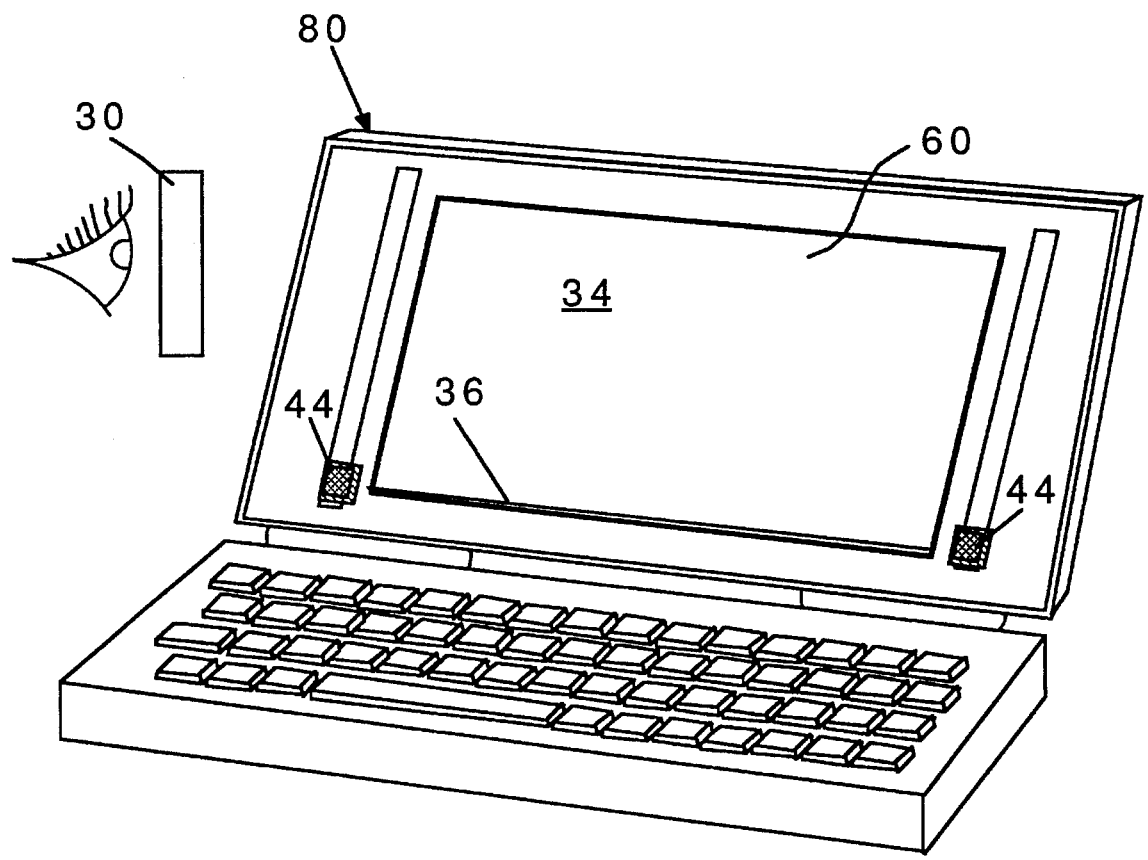

In FIGS. 6A, 6B, and 6C liquid crystal display system 60 has been integrated into a laptop computer 80. The laptop computer 80 contains a computing means such as a CPU, a data entry means such as a keyboard, and a data storage means such as a floppy disk drive or hard disk drive. With levers 44 at the top of the display screen, the entire screen is visible to the user, and the laptop computer is functional as common in the art today. The entire screen with the message "TEXT" is portrayed and the user and everyone within a forty-five degree viewing angle can view it.

In FIG. 6B the levers 44 have been pushed to the middle of the screen where below the levers 44 the polarized region 36 displays the text on the lower portion of the screen, and above levers 44 transparent belt 34 renders text invisible. The user and everyone within a forty-five degree viewing angle can view information displayed on lower portion of the laptop display 60. In FIG. 6C the levers 44 have been pushed to the bottom of the screen where transparent belt 34 renders text on the entire display invisible. A user with remote polarizer 30, having the correct plane of polarization, can see the entire display and can compute with complete privacy. All others within any viewing angle will see a faintly glowing display with no text.

Figure 7A:
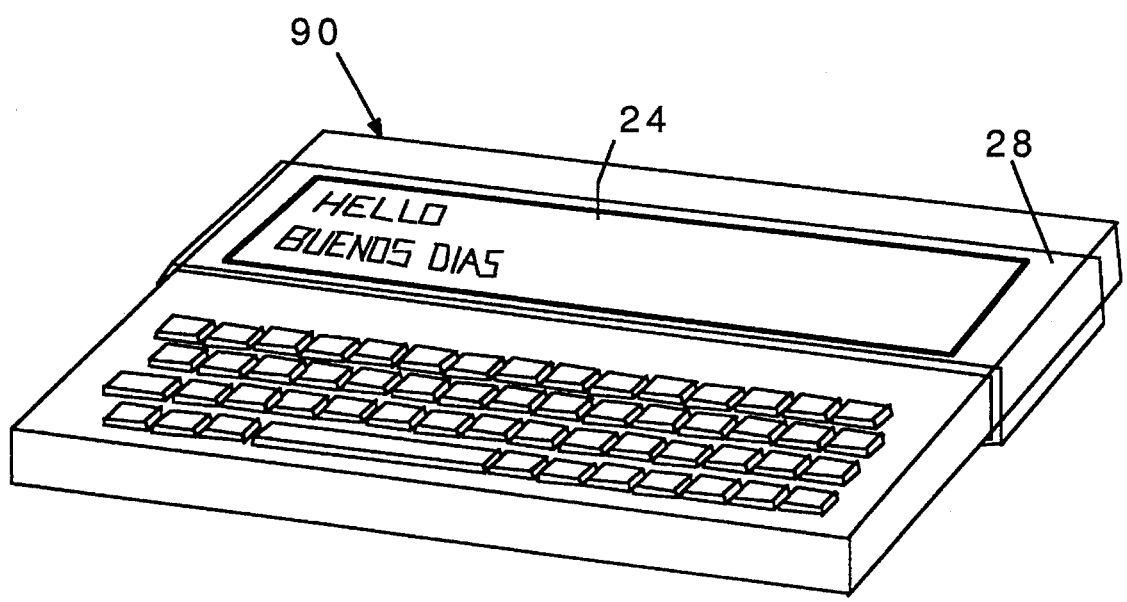
FIGS. 7A, 7B, and 7C are perspective views of an electronic pocket-sized databank utilizing an LCD assembly, while it is in use, according to the invention.
Figure 7B:
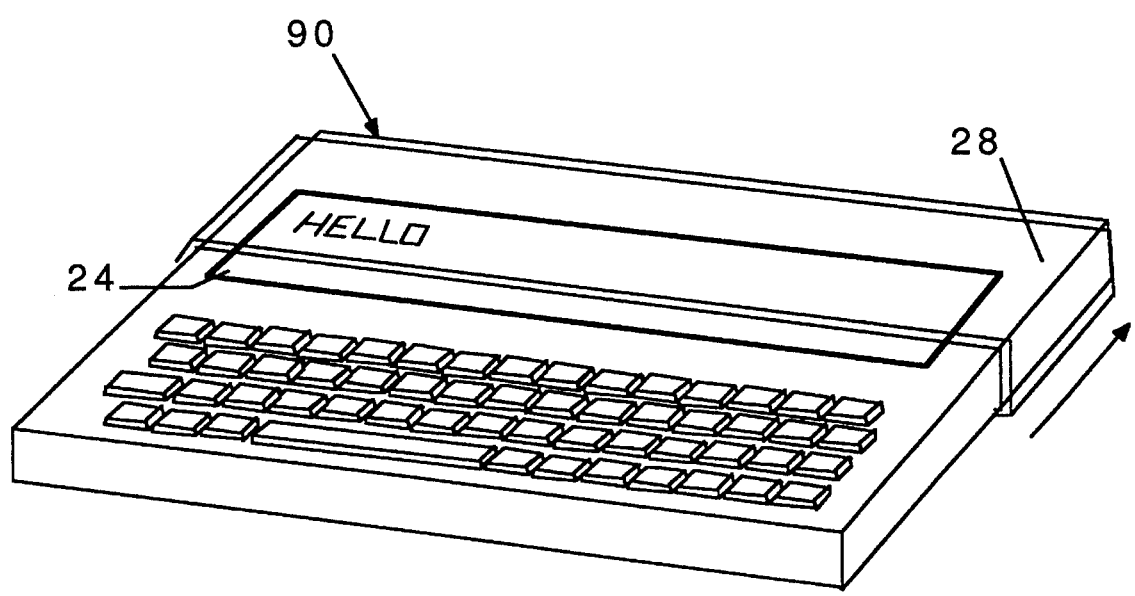
Figure 7C:
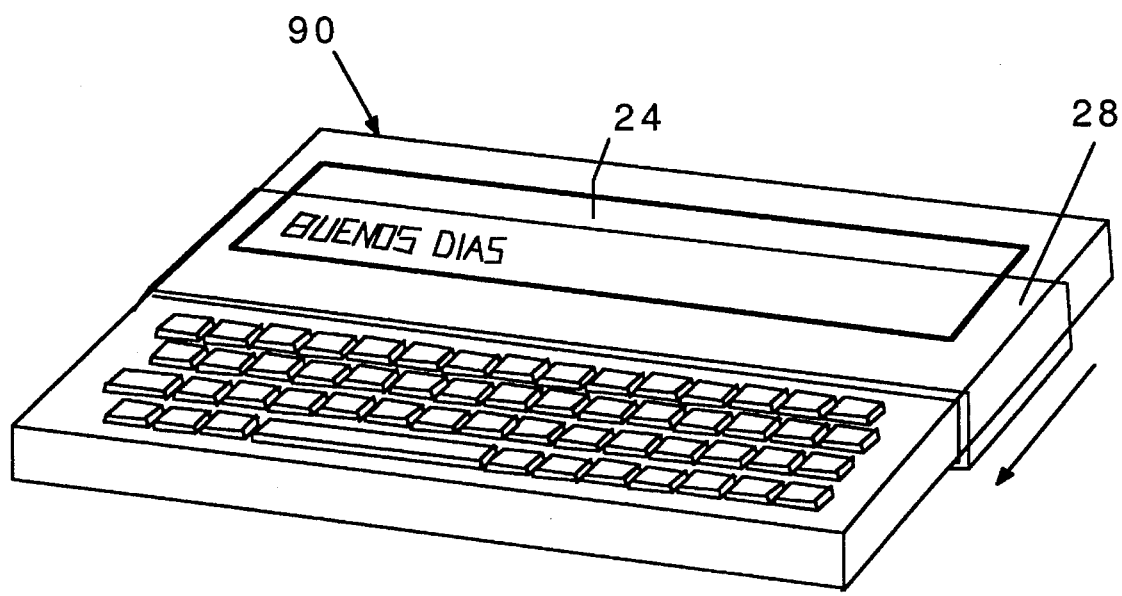

In FIGS. 7A, 7B, and 7C liquid crystal display of FIG. 2 has been integrated into a hand-held electronic databank 90. The databank 90 contains a computing means such as a microcomputer and a data entry means such as a keypad. This particular databank has a two line alphanumeric display and is programmed as a language translator between English and Spanish. An English word is displayed on the first line, and Its Spanish equivalent is displayed on the second line. The databank is programmed in two different modes. In the first mode, the user would enter an English or Spanish word, and the databank would display the word's translation. For this mode the user would want to view both lines of text to view the word and its translation. FIG. 7A shows the configuration of a databank to use in this fashion. The liquid crystal display 24 has a polarizer 28 that is as tall as liquid crystal display 24 and is formed to wrap around the outer housing of the databank. The wraparound feature provides the retaining element 26 that is portrayed in FIG. 2. The second mode is a flashcard mode where English and Spanish words are randomly displayed on the screen. Here the user can align the polarizer 28 with the top line of liquid crystal display 24 as in FIG. 7B, see the English word, and guess its translation. After guessing, the users can slide the polarizer 28 back to its position shown in FIG. 7A and confirm their answer. If the user would like to test their skills at translating Spanish to English then they would align polarizer 28 as shown in FIG. 7C, see the Spanish word, then guess the English translation. After guessing, the users can slide the polarizer 28 back to its position shown in FIG. 7A and confirm their answer. This configuration not only lends itself to flashcard modes, but quiz games, puzzles (Word Scramble) etc.

In FIGS. 8A, 8B, and 8C various prior art LCD representations are illustrated. Twisted Nematic (TN) liquid crystal display 96 and Super Twisted Nematic (STN) liquid crystal display 94 differ in optical characteristics and construction but are functionally subsets of previously described liquid crystal displays 24. The construction of active or passive TN and STN liquid crystal displays vary by manufacturer and are known to those skilled in the art. In FIG. 8A the liquid crystal display system illustrated has a TN liquid crystal display 96 with two linear polarizers 22 to polarize incident light and cross polarize the image created by TN liquid crystal display 96. In FIGS. 8B and 8C the liquid crystal display system illustrated has an STN liquid crystal display 94 with two linear polarizers 22 to polarize incident light and cross polarize the image created by the STN liquid crystal display 94. Additional retardation films 92 are added to compensate for optical color shifts due to the birefringent nature of STN LCDs. FIG. 8B represents a single compensated LCD assembly and FIG. 8C represents a double compensated assembly. Partitioning of displays into visible and invisible regions is possible independent of the type and construction of the LCD.

In FIG. 9 prior art of a representative LCD projection system is shown. Light produced from lamp 20 travels through condensor lens 100, is polarized by polarizer 22, an image is formed by liquid crystal display 24, crossed polarized by a second polarizer 22, focused by projection lens 98 and projected on to projection screen 18. When projection screen 18 is of front projection type the first viewer sees the image and when projection screen is of the rear projection type the second viewer sees an image. Projection screen 18 may have a polarization preserving surface such as brushed aluminum when used for 3D movies. There are many LCD projection schemes known in the art and all of them can be configured with LCD partitioned images with visible and invisible regions.

Figure 10A:
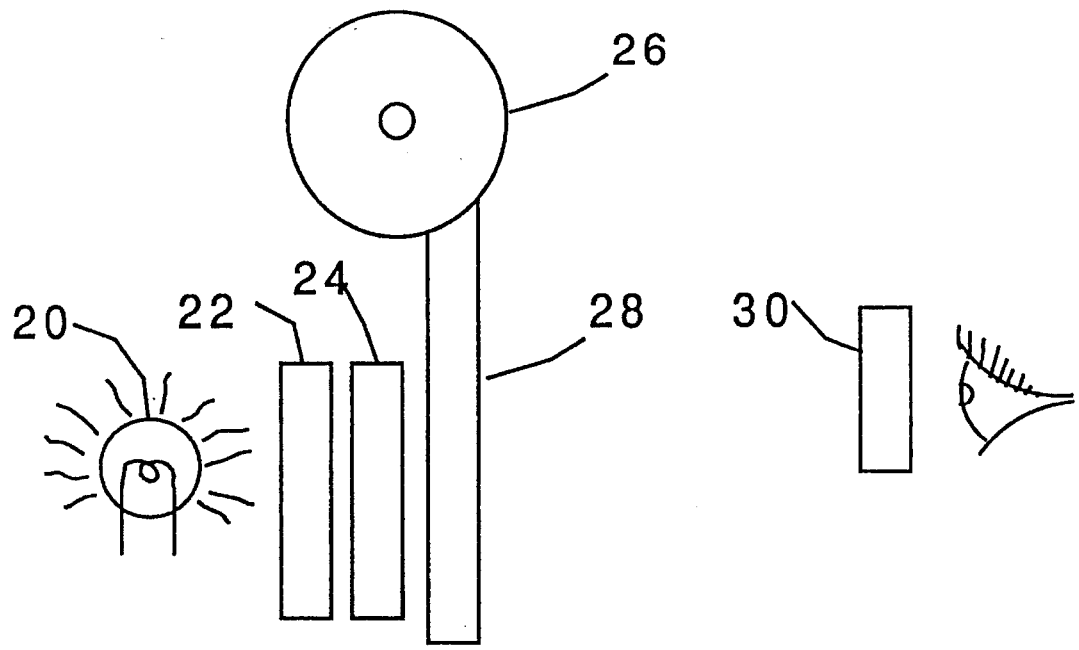
FIGS. 10A and 10B are partial cross sectional views of an LCD assembly while it is in use, according to another embodiment of the invention.
Figure 10B:
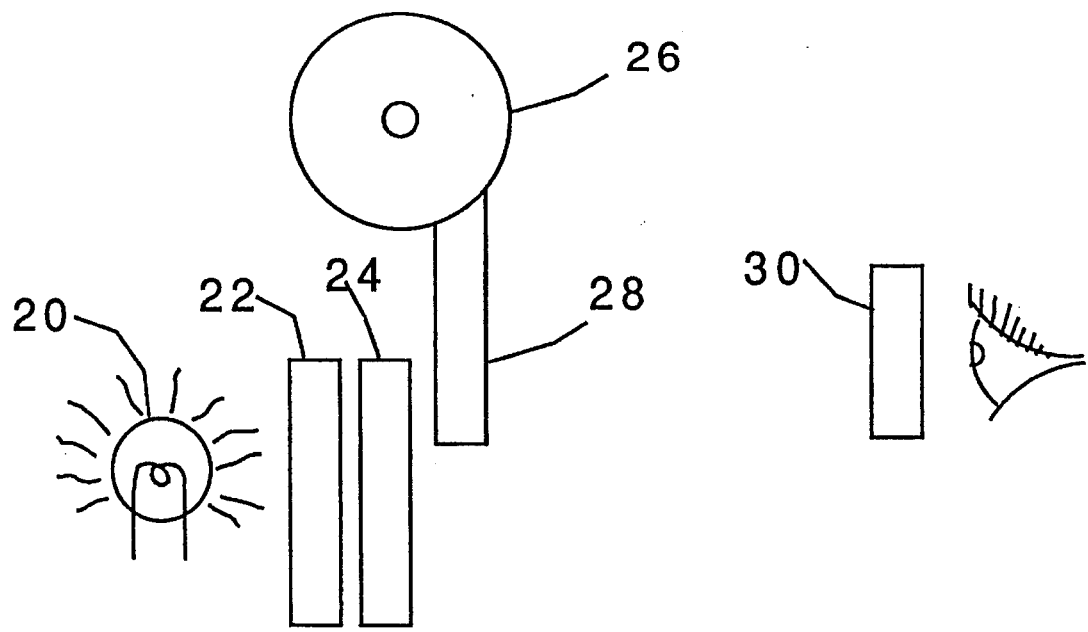

In FIGS. 10A and 10B another embodiment of the invention similiar to the first embodiment depicted by FIG. 2 where the retaining means 26 is configured using a spring return latching roller mechanism. The spring return latching roller mechanism would have mechanics known in the art of a common adjustable window shade. The movable polarizer would be attached to the spring return mechanism so that it can be deployed to completely cover the liquid crystal display 24 as depicted in FIG. 10A or can be latched to partition to screen at any desired height as depicted in FIG. 10B.

Figure 11A:
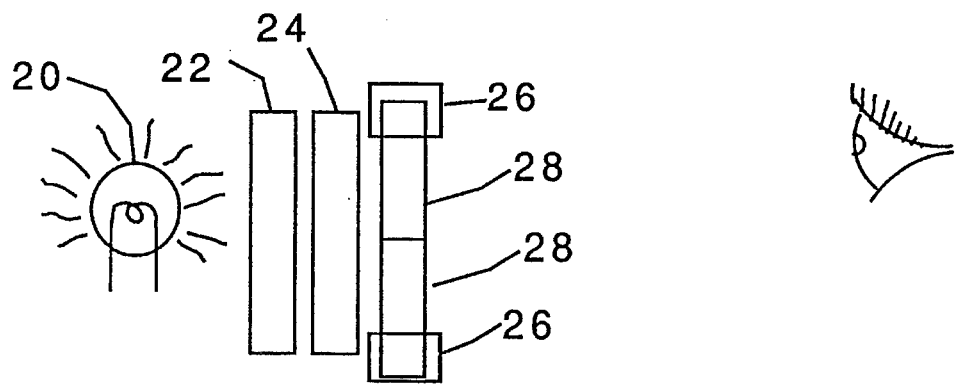
FIGS. 11A, 11B, and 11C are partial cross sectional views of an LCD assembly while it is in use, according to another embodiment of the invention.
Figure 11B:
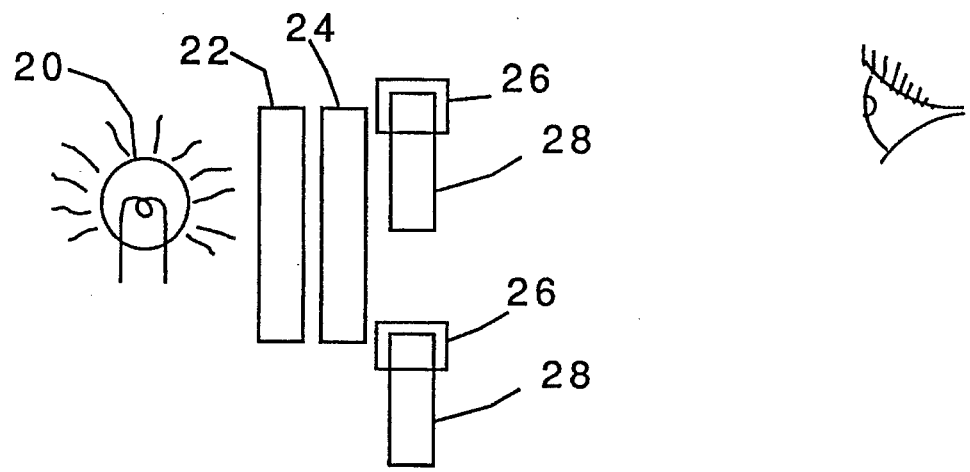
Figure 11C:
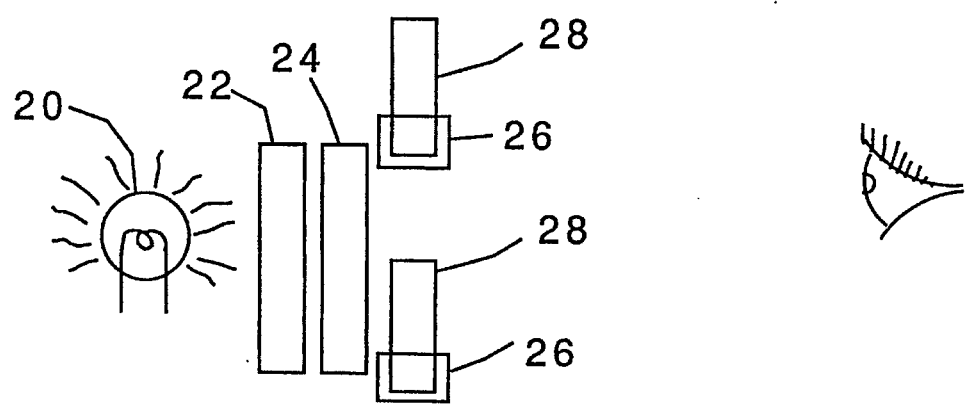

In FIGS. 11A, 11B, and 11C another embodiment of the invention similiar to the first embodiment depicted by FIG. 2 where no remote polarizer 30 is illustrated and where multiple (2) mobile polarizers 28 replace the single mobile polarizer 28 of FIG. 2. In FIG. 11A both mobile polarizers are positioned so that the entire image on the display is visible to the viewer. In FIG. 11B the bottom mobile polarizer 28 is retracted and the top mobile polarizer 28 is postioned so that the top half of the image on the display is visible to the viewer. In FIG. 11C the top mobile polarizer 28 is retracted and the bottom mobile polarizer 28 is postioned so that the bottom half of the image on the display is visible to the viewer. Both mobile polarizers can be positioned to accomplished any desired partitioning of the screen. The 2 mobile polarizers 28 illustarted here are stacked vertically, any number of polarizers can be stacked in a multitude of orientations and positions to accomplish any desired partitioning of the screen.

Figure 12A:
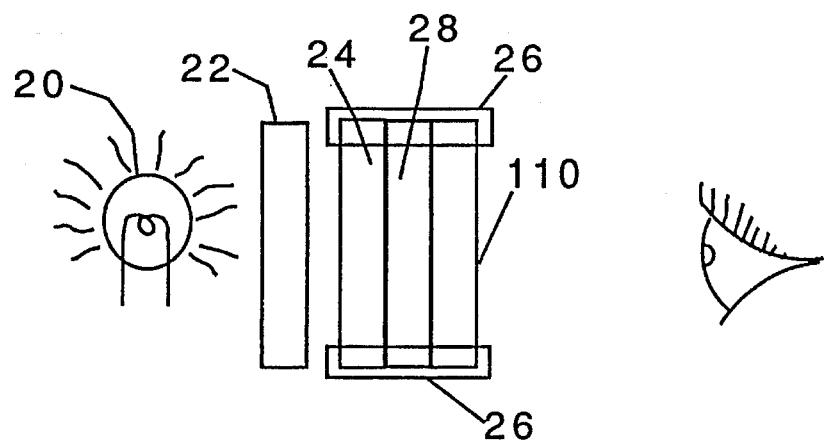
FIGS. 12A, 12B, and 12C are partial cross sectional views of an LCD assembly while it is in use, according to another embodiment of the invention.
Figure 12B:
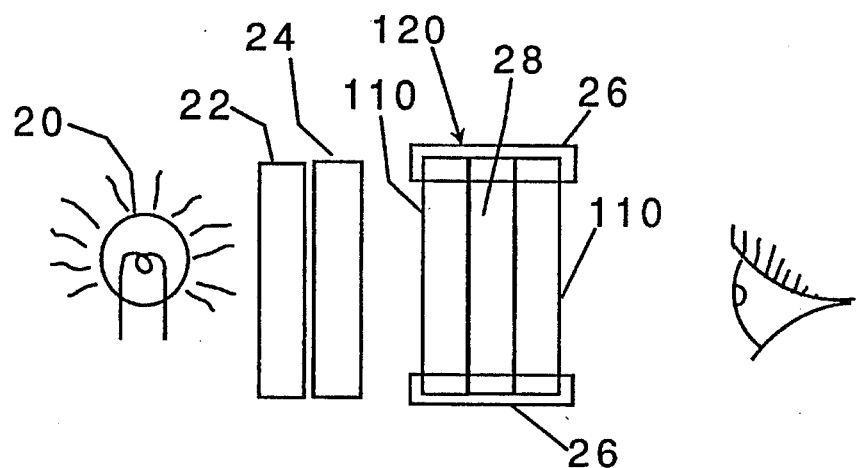
Figure 12C:
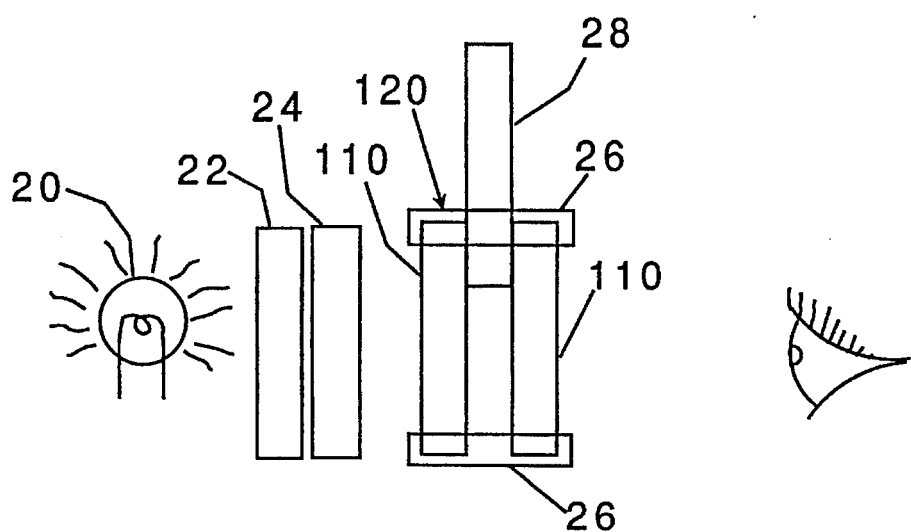

In FIGS. 12A, 12B, and 12C another embodiment of the invention similiar to the first embodiment depicted by FIG. 2 where no remote polarizer 30 is illustrated and transparent retaining panels 110 are used to maintain the position of mobile polarizer 28. In FIG. 12A retaining means 26 applies uniform pressure between liquid crystal assembly 24 and transparent retaining panel 110 to sandwich and secure mobile polarizer 28. By loosening the tension of retaining means 26, polarizer 28 can be repositioned, then locked into position again by retensioning retaining means 26. The transparent retaining panel 110 can be fabricated from a host of materials such as glass. The same polarizer positioning mechanism can be achieved by sandwiching mobile polarizer 28 between two transparent retaining panels 110 as illustrated in FIG. 12B. The LCD partitioning subassembly 120 includes retaining means 26, at least 1 mobile polarizer 28, and transparent retaining panels 110. In FIG. 12C the mobile polarizer has been positioned so that only the top third of the screen is visible.

Figure 13A:
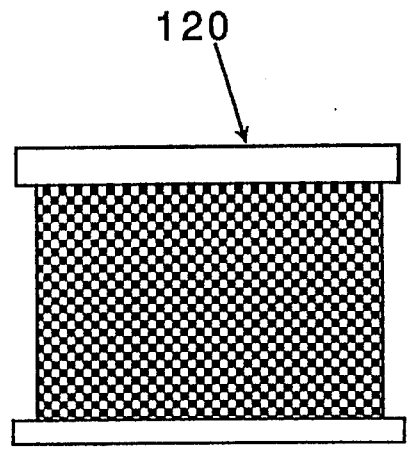
FIGS. 13A, 13B, 13C, and 13D are partial front views of an LCD assembly while it is in use, according to another embodiment of the invention.
Figure 13B:
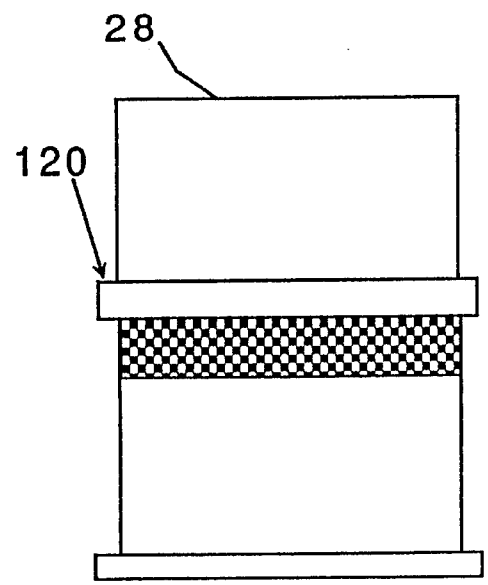
Figure 13C:
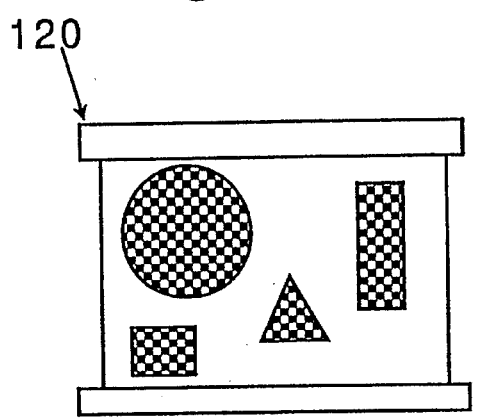
Figure 13D:
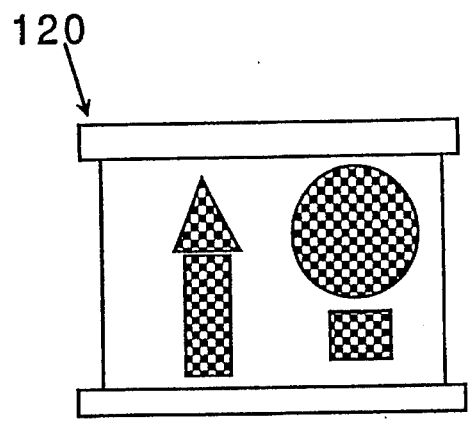

In FIGS. 13A, 13B, 13C and 13D front views of LCD display assemblies depicting the image seen by the viewer in FIGS. 12B and 12C. The liquid crystal display has an electronic image of a checkerboard pattern across the entire display. When a single mobile polarizer 28, at least as large as the LCD 24 is positioned in complete alignment such as illustrated in FIG. 12B the resulting image is illustrated in FIG. 13A. As mobile polarizer 28 is displaced upward as shown in FIG. 12C the resulting image is illustrated in FIG. 13B. If multiple mobile polarizers 28, one shaped like a circle, one like a square, one like a rectangle, and one like a triangle are sandwiched in subassembly 120 the resulting image could look like FIG. 13C. If subassembly 120 is disassembled, the four mobile polarizers 28 moved, and subassembly 120 reassembled, the resulting image would be repartitioned to look like the image in FIG. 13D. An infinite number of shapes and sizes of mobile polarizers 28 could partition the screen in this manner.

Figure 14:
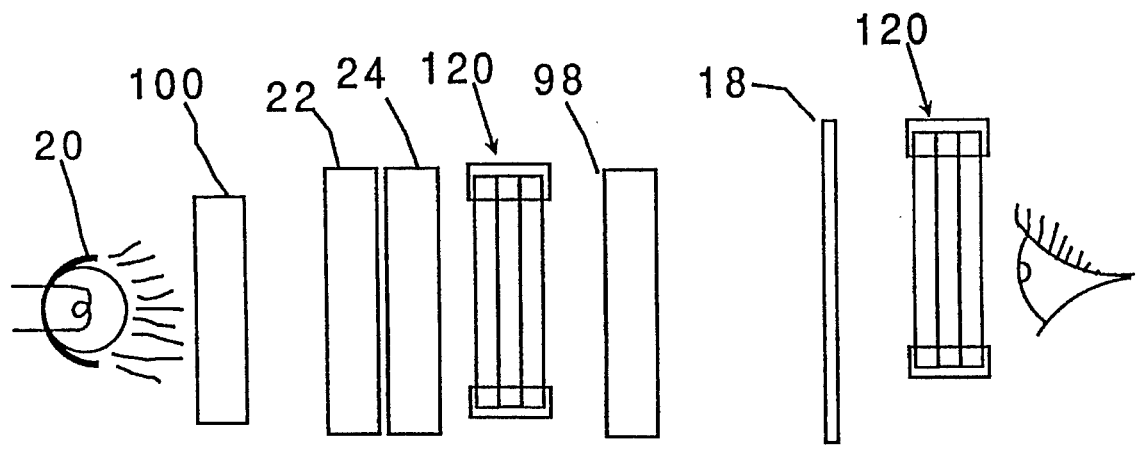
FIG. 14 is a schematic of a typical LCD Projection system, according to another embodiment of the invention.

In FIG. 14 the schematic view of a representative LCD projection system as depicted in FIG. 9 has been modified with the removal of one polarizer 22 and the addition of LCD partitioning subassembly 120 in two possible locations. With subassembly 120 positioned between the liquid crystal display 24 and the screen 18 the projected image is partitioned according to the positioning of the polarizers within subassembly 120 where all viewers of the screen 18 can see an image where the subassembly 120 provides cross polarization. Alternately, if the LCD partitioning subassembly is located between the screen 18 and the viewer only the viewers that have polarizers aligned with the image on the projection screen can see a partitioned image. Relative partitioning of the screen depends on the viewers proximity to the subassembly 120. Any of the partitioning embodiments disclosed can be utilized within any LCD projection scheme.

It will thus be seen that the objects set forth above, and those made apparent from the preceding descriptions, are effectively attained and since certain changes may be made in the above construction without departing from the spirit and scope of the invention, it is intended that all matter contained in the above description or shown in the accompanying drawings, shall be interpreted as illustrative and not in a limiting sense.

It is also to be understood that the following claims are intended to cover all generic and specific features of the invention herein described and all statements of scope of the invention which as a matter of language, might be said to fall therebetween.

What is claimed is:

1. An apparatus for displaying images on a liquid crystal display having partitionable selectively visible regions, comprising:

first polarizing means for forming planer polarized light background from incident light;

a liquid crystal display panel for forming images crosspolarized with polarized light background in substantially parallel alignment with said first polarizing means having a front side displaying said images;

moveable polarizing means for selectively covering at least a region of liquid crystal display panel, disposed in substantially parallel alignment with said liquid crystal display panel, disposed at the front side of said liquid crystal display panel, opposite said first polarizing means;

remote polarizing means disposed away from said liquid crystal display having polarization relative to said movable polarizing means which is one of planar-polarization or cross-polarization; said remote polarization means operative for enabling a viewer looking through said remote polarizing means to view said images both covered and uncovered by said movable polarizing means; and wherein said regions uncovered by said movable polarizing means are invisible for viewing without said remote polarizing means;

moving means connected to said movable polarizing means for displacing said movable polarizing means.

2. An apparatus for displaying images as claimed in claim 1, wherein said movable polarizing means are disposed proximal to said liquid crystal display and are linearly translatable.

3. An apparatus for displaying images as claimed in claim 1, including retaining means for retaining said movable polarizing means, wherein said retaining means comprise a transparent continuous belt having a polarized region forming said movable polarizing means, at least one roller for supporting said continuous belt, said belt tensioned against said roller, and wherein said movable polarizing means are located proximal to said liquid crystal display panel.

4. An apparatus for displaying images as claimed in claim 3, wherein said moving means comprises a knob attached to one of said rollers for providing linear displacement of said movable polarizer means.

5. The retaining means according to claim 3, including sprockets on at least one of said continuous belt and said rollers.

6. An apparatus for displaying images as claimed in claim 1 including retaining means for retaining said movable polarizing means, wherein said retaining means comprises a transparent film having a polarized region forming said movable polarizer and a spring return latching roller supporting said transparent film.

7. An apparatus for displaying images as claimed in claim 1, including retaining means for retaining said movable polarizing means, wherein said retaining means includes movable polarizer material, and an outer housing said liquid crystal panel for supporting said polarizer material wrapped around said housing.

8. An apparatus for displaying images as claimed in claim 1, including a handle attached to said movable polarizing means for effecting linear displacement of said polarizing means.

9. An apparatus for displaying images as claimed in claim 1, wherein said moving means comprise a motor and a transmission connected to said moving means so that rotation of said motor causes a linear displacement of said movable polarizing means.

10. The apparatus according to claim 9, wherein said motor has a motor control for controlling rotation of said motor, and programming means in said motor control for programming said motor control.

11. The apparatus according to claim 9, wherein said motor has a motor control, including position sensing sensors connected with said motor control for sensing position of said movable polarizer with respect to said liquid crystal panel.

12. The apparatus according to claim 9, wherein said motor has a motor control and manual start/stop controls connected to said motor control.

13. The apparatus according to claim 9, wherein said motor has a motor control, and wherein motion of said motor is initiated by software control.

14. An apparatus for displaying images as claimed in claim 1, wherein remote polarizing means includes at least one lens being an article of eyewear.

15. The remote polarizing means accoring to claim 14, wherein said eyewear includes prescription corrective optics and a polarizing film coated onto said optics.

16. An apparatus for displaying images having partitionable regions, including selectively visible and invisible regions of displayed information comprising:

polarizing means for forming a plane-polarized light background from incident light;

a liquid crystal panel for forming cross-polarized images in parallel alignment with said plane-polarized background;

movable polarizing means for selectively distinguishing at least one of said images on said liquid crystal panel from said plane-polarized background by cross-polarization of one of said images or by cross-polarization of said background, including linear translation means connected to said polarizing means for forming partitions on said liquid crystal panel into regions that are visible where there is optical alignment of said liquid crystal panel with said background polarizing means, and with said movable polarizing means;

retaining means for retaining alignment of said movable polarizing means in linear movement of said movable polarizing means; and translation means connected to said movable polarizing means for providing linear displacement of said movable polarizing means.

17. An apparatus for displaying images as claimed in claim 16, wherein said movable polarizing means include a plurality of movable polarizers for creating a plurality of covered and uncovered regions on said liquid crystal panel.

18. An apparatus for displaying images as claimed in claim 16, including retaining means, the apparatus comprising transparent panels disposed in parallel alignment with said movable polarizing means for sandwiching said movable polarizing means between said transparent panels.

19. An apparatus for displaying images as claimed in claim 16, wherein said movable polarizing means are disposed proximal to said liquid crystal display panel and operative for linear translation of movable polarizing means in relation to said liquid crystal display panel.

20. An apparatus for displaying images as claimed in claim 16, wherein said retaining means include an outer housing for housing said liquid crystal panel, and including movable polarizer material wrapped around said outer housing.

21. An apparatus for displaying images as claimed in claim 16, wherein said moving means include a handle connected to said movable polarizer for effecting linear displacement of said movable polarizer.

22. An apparatus for private portable computing comprising:

computing means:

data entry means connected to said computing means;

data storage means connected to said computing means;

display means connected to said computing means having selectively retentive partitionable regions for providing visible, invisible, and narrow field of view of displayed information.

23. An apparatus for private portable computing as claimed in claim 22, wherein said display means include polarizing means for forming a plane-polarized light background from incident light, a liquid crystal panel for forming cross-polarized images against said plane-polarized background, movable polarizing means disposed proximal to said liquid crystal panel for selectively displaying images on said liquid crystal panel against said plane-polarized background by cross-polarization between said images and said background, including linear translation means connected with said movable polarizing means for partitioning said liquid crystal panel into regions that are visible where there is optical alignment of said liquid crystal panel with said background polarizing means, and with said movable cross-polarizing means, remote polarizing means operative to complement said movable polarizer and provide a narrow viewing angle of said images in regions where there is no optical alignment of said liquid crystal panel with said background polarizing means, and with said movable cross-polarizing means, and remote polarizing means being generally plane-polarized to said movable polarizer.

* * * * *